United States Patent
Allen

(10) Patent No.: US 6,755,973 B2
(45) Date of Patent: Jun. 29, 2004

(54) WASTE WATER TREATMENT PROCESS FOR ANIMAL PROCESSING CONTAMINANT REMOVAL

(75) Inventor: Stephen Donald Allen, Garden City, ID (US)

(73) Assignee: Water Solutions Inc., Sioux Falls, SD (US)

( * ) Notice: Subject to any disclaimer, the term of this patent is extended or adjusted under 35 U.S.C. 154(b) by 0 days.

(21) Appl. No.: 10/115,821

(22) Filed: Apr. 4, 2002

(65) Prior Publication Data

US 2003/0189006 A1 Oct. 9, 2003

(51) Int. Cl.⁷ ................................................ C02F 1/56
(52) U.S. Cl. ...................... 210/636; 210/638; 210/639; 210/651; 210/666; 210/667; 210/668; 210/670; 210/694; 210/710; 210/721; 210/725; 210/727; 210/734; 210/793; 210/905; 426/657
(58) Field of Search .............................. 210/638, 639, 210/651, 670, 666–668, 694, 710, 721, 724, 725, 727, 728, 734, 735, 793, 905, 636; 426/641, 644, 647, 657

(56) References Cited

U.S. PATENT DOCUMENTS

| | | |
|---|---|---|
| 3,276,458 A | 10/1966 | Iversen et al. |
| 3,337,454 A | 8/1967 | Gruenwald |
| 4,013,555 A * | 3/1977 | Davis ........................ 210/725 |
| 4,105,556 A | 8/1978 | D'Amaddio et al. |
| 4,193,869 A | 3/1980 | Brucker et al. |
| 4,298,621 A | 11/1981 | Samis et al. |
| 4,388,195 A * | 6/1983 | von Hagel et al. ......... 210/709 |
| 4,808,287 A | 2/1989 | Hark |
| 4,966,713 A * | 10/1990 | Keys et al. ................. 210/705 |
| 5,059,317 A | 10/1991 | Marius et al. |
| 5,173,190 A | 12/1992 | Picek |
| 5,178,773 A * | 1/1993 | Kerlin et al. ............... 210/724 |
| 5,262,047 A | 11/1993 | Benskin et al. |
| 5,374,352 A | 12/1994 | Pattee |
| 5,451,326 A * | 9/1995 | Carlson et al. ............. 210/708 |
| 5,514,282 A | 5/1996 | Hibbard et al. |
| 5,558,775 A | 9/1996 | Busch, Jr. |
| 5,597,490 A * | 1/1997 | Chung et al. ............... 210/727 |
| 5,807,486 A | 9/1998 | Busch, Jr. |
| 5,897,785 A | 4/1999 | Billings |
| 5,900,220 A | 5/1999 | Allen |
| 5,904,853 A | 5/1999 | Allen et al. |
| 5,910,251 A | 6/1999 | Allen et al. |
| 5,914,040 A * | 6/1999 | Pescher et al. ............. 210/638 |
| 5,916,437 A | 6/1999 | Levitin |
| 5,965,027 A | 10/1999 | Allen et al. |
| 6,280,631 B1 * | 8/2001 | Sommese et al. ........... 210/727 |
| 6,372,145 B1 * | 4/2002 | Tarbet et al. ............... 210/710 |
| 6,428,705 B1 * | 8/2002 | Allen et al. ................. 210/638 |

* cited by examiner

Primary Examiner—Peter A. Hruskoci
(74) Attorney, Agent, or Firm—Vedder, Price, Kaufman & Kammholz, P.C.

(57) ABSTRACT

A process and system for removing animal processing contaminants and fats, oils, and greases from large volume quantities of waste water. In the process, a waste water stream containing the contaminants is treated with a chemical oxidant, polymer compound and coagulant to create a particle having a diameter greater than 50 microns. Treated waste water is passed through a microfiltration membrane which physically separates the contaminant particle from the waste water. Commercially available microfiltration membranes having a pore size in the range of 0.5 micron to 10 microns may be used. The treated waste water flow rate through the microfiltration membranes can range from at least 200 gallons per square foot of membrane per day ("GFD") to in excess of 750 GFD. Solids are removed from the membrane surface by periodically backflushing the microfiltration membranes and draining the filtration vessel within which the membranes are located. The dislodged solid material within the filtration vessel is flushed into a holding tank for further processing of the solids. The solid waste product may be incorporated into products for consumption by a different species.

18 Claims, 1 Drawing Sheet

WASTE WATER TREATMENT PROCESS FOR ANIMAL PROCESSING CONTAMINANT REMOVAL

FIELD OF THE INVENTION

The present invention relates to the treatment and purification of waste water at high flow rates. More particularly, the present invention relates to process and apparatus for removing animal processing contaminants and fats, oils and greases ("FOG") from large volume quantities of waste water.

BACKGROUND OF THE INVENTION

Many animal processing operations generate extremely large quantities of water containing contaminant and FOG. For example, cattle processing plants are known to generate up to 2,000 gallons per minute ("gpm") of water or more. Often this water contains biological and chemical contaminant and FOG which must be removed from water before it can be safely discharged into the environment.

Current techniques for treating animal processing waste water include screening and flotation. Such systems are able to demonstrate 70–80% compliance to discharge regulations. For example, biologic oxygen demands ("BOD") and chemical oxygen demand ("COD") requirements for discharge into the environment is less than 1,000 parts per million ("ppm").

The most common system for treating animal processing waste water is generally referred to as dissolved air flotation ("DAF"). This system uses a combination of dissolved air and chemistry to float the contaminants and to remove them via skimming of the solids from the surface. The solids retrieved from this process are not renderable, or usable again. Rather, the solids are wasted and applied to the land. The processing plant must pay to have these solids removed from the premises.

Another less used system is microbial, which uses microbes to digest the contaminants and thus render them harmless and non-contributory to the loading (i.e., BOD or COD) and total suspended solids ("TSS") from the waste stream. This process is time consuming and costly and the flux or amount of through put of waste water is limited.

Filters have been used to remove animal processing contaminants and FOG from waste water. However, traditional microfiltration membranes had a pore size of approximately 5.0 microns with a flex rate of 50–100 gallons per square foot of membrane per day ("GFD"). At this flux rate, it would be necessary to have membrane of at least 360,000 square feet to process 2,500 gpm of waste water. If the waste water flow rate is 5,000 gpm, then the membrane size would need to be at least 720,000 square feet. Such membrane sizes are prohibitively large and expensive. Therefore, there exists a need in the art to provide a process and a system for removing animal processing contaminants and FOG from large quantities of waste water and overcoming the aforementioned disadvantages. It would be a major advancement in the art to provide such a process and system which does not require a large footprint (are required for operation). It would also be an important advancement in the art to provide such a process and system which consistently complies with environmental discharge requirements. Such processes and system are disclosed and claimed herein.

SUMMARY OF THE INVENTION

The present invention is directed to a process for removing animal contaminants, such as animal waste, blood, tissue, washing solutions, etc. in the presence of high fats, oils and greases from large volumes of waste water and reclaiming the solids in a form acceptable to rendering of the solids. The present invention can readily be adapted for removing other food processing contaminants found in waste water by using suitable oxidation, polymeric and coagulant chemistry. The oxidant reacts with the contaminants and FOG to break down proteins. The polymeric compound dissociates and binds to suspended contaminant and FOG solids to form a first particulate having a size approximately in the range of 15–50 microns. The coagulant reacts with the first particulate to form a second particulate having a size greater than 50 microns.

Known and novel oxidants, polymers and coagulants are available to achieve the desired particulate formation. For instance, sodium hypochlorite, ozone, peroxides, potassium hypo chloride and chlorine dioxide are well-known oxidants. Aluminum chlorohydrate, polyaluminum chloride, calcium aluminate and sodium aluminate are well-known in organic coagulants organic and polymeric coagulants can also be used, such as anionic polyacrylamide, cationic polyamine can also be used. The stoichimetric ratio of coagulant to contaminate is preferably optimized result in acceptable removal at minimum coagulant cost. The required coagulant concentration will depend on several factors, including contaminant influent concentration, waste water flow rate, contaminate effluent compliance requirement, coagulant/contamination reaction connectics, etc.

Treated waste water is passed through a microfiltration membrane which physically separates the contaminants and FOG from the waste water. Suitable microfiltration membranes are commercially available for manufacture such as W. L. Gore and National Filter Media. For instance, one GOR-TEX® membrane used in the present invention is made from polypropylene felt with a sprayed coating of Teflon. The Teflon coating is intended to promote water passage through the membrane. Such microfiltration membrane material has been found to be useful for many waste water treatment systems. The microfiltration membrane may also be comprised of a polyethylene membrane mounted to a polypropylene or polyethylene felt backing. These membrane materials have also been found to be useful for many waste water treatment systems.

The microfiltration members are used in a tubular "sock" configuration to maximize surface area. The membrane sock is placed over a slotted tube to prevent the sock from collapsing during use. A net material is placed between the membrane sock and the slotted tube to facilitate flow between the membrane and the slots of the tube. In order to achieve the extremely high volume flow rates, a large number of membrane modules, each containing a number of individual filter socks are used.

The microfiltration membranes preferably have a pore size in the range of 0.5 microns to 10 microns. In controlling the ratio of coagulant to contaminant, 99.99% other created particles can be greater than 10 microns. This allows the use of larger pore size microfiltration membranes. It has been found that the treated waste water flow rate through 0.5 micron to 10 microfiltration membranes is at least 250–300 GFD and typically over 750 GFD.

Solids are preferably removed from the membrane surface by periodically backflushing the microfiltration membranes and draining the filtration vessel within which the membranes are located. The periodic, short duration backflush removes any buildup of contaminants from the walls of the microfiltration membrane socks. The dislodged solid material within the filtration vessel is flushed into a holding tank for further processing of the solids.

The waste water treatment system disclosed herein is designed to provide compliance with the animal processing contaminant discharge effluent limits. Waste water pretreatment chemistry for both soluble and insoluble contaminants, allows for the creation of particulates which are efficiently removed by the microfiltration membranes.

BRIEF DESCRIPTION OF THE DRAWINGS

In the course of this detailed description, the reference will be frequently made to the attached drawings in which.

DETAILED DESCRIPTION OF THE INVENTION

Figure 1:
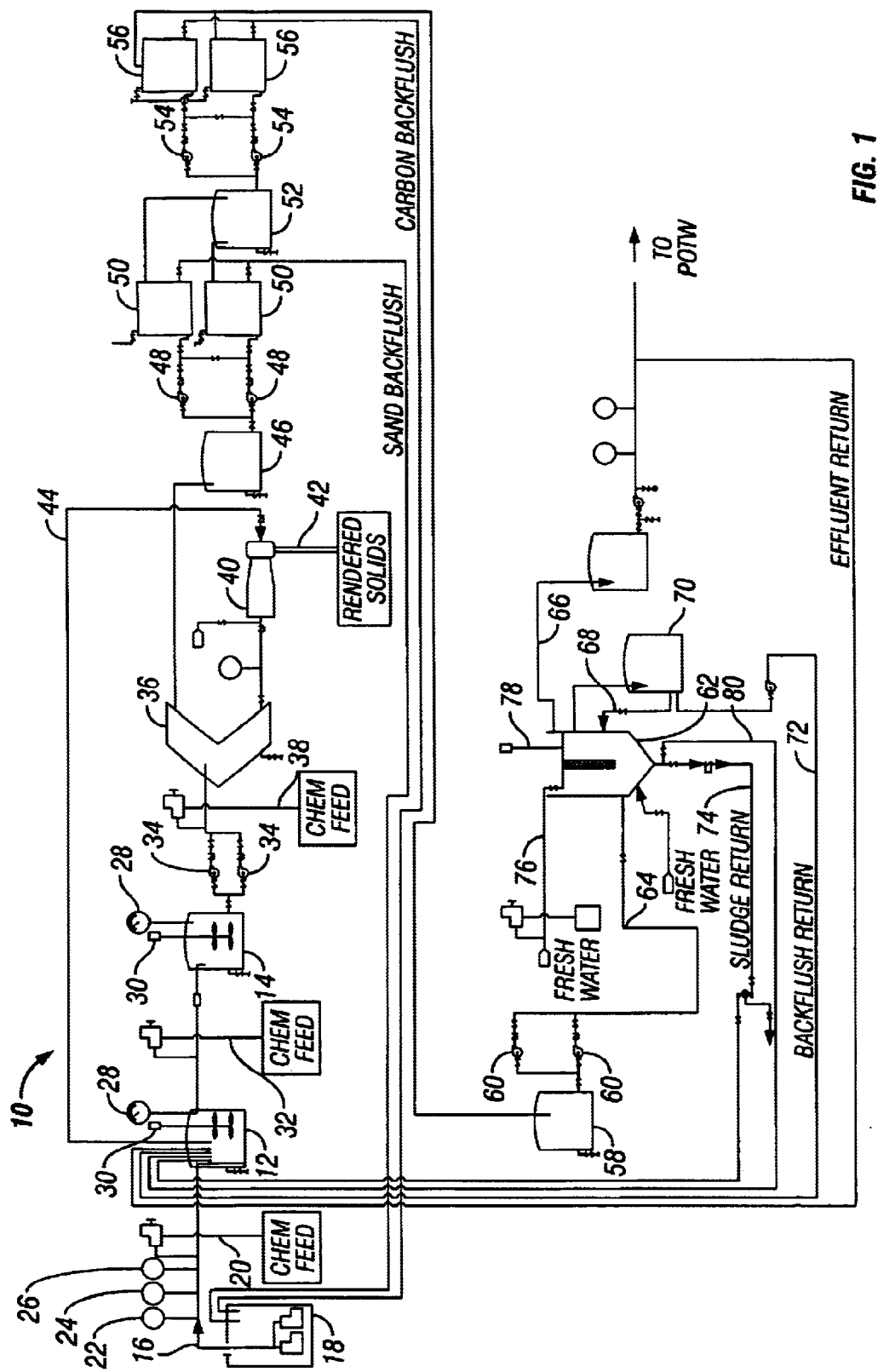
FIG. 1 is a schematic representation of a waste water pretreatment and microfiltration system and apparatus for high flow impurity removal.

The present invention is directed to a process for removing animal processing contaminants such as animal wastes, blood, tissue, washing solutions, etc. in the presence of all FOG from large volumes of waste water.

In operation, the waste water is collected and pretreated with one or more oxidants to break down proteins. The waste water is then treated with an inorganic polymeric compound which disassociates and binds to suspended contaminant and FOG solids to form a first particulate having the size approximately in the range of 15–50 microns. Waste water is then treated with one or more chemical coagulants such that the first particulate reacts with the coagulant(s) to form second particulate having a size greater than 50 microns. The chemical oxidants, polymeric compounds and coagulants are preferably mixed with the waste water using reaction vessels or static in-line mixers. Although other mixing methods can be used.

The treated waste water is then passed through a microfiltration membrane having a pore size in the range of 0.5 micron or 10 microns to remove the contaminant particulates. In such a system, waste water flow rates exceeds 250–300 GFD and are preferably greater than 750 GFD. The microfiltration membranes periodically backflush to remove solids from the membrane surface. The rejected solids are gravity collected in the filter vessel bottom and time cycled discharged into a settling tank for further sludge processing. Preferably, the solids report back to the beginning of the treatment system where they are retreated for maximum solids recovery and water reclamation.

The microfiltration membranes are preferably provided in a cassette arranged module. The microfiltration membranes provide a positive particle separation in a high recovery dead head filtration array. The dead head filtration operates effectively at low pressures, preferably no more than 24 psi, and high flow rates, allowing 100% discharge of the supplied water with no transfer pumps needed. Solids which settle on the wall of the membrane during filtration are periodically backflushed away (and gravity settled) from the membrane surface to ensure a continuously clean filtration area. The individual cassette module design allows for easy replacement of the membrane modules.

Currently preferred filter socks useful with the present invention contain a Teflon coating on a polypropylene or polyethylene felt backing material. Such socks are available from W. L. Gore. Another presently preferred filter sock, manufactured by National Filter Media, consists of a polyethylene woven membrane bonded to a polypropylene or polyethylene felt backing. Membrane "failure" is due primarily to flux rate loss, not mechanical failure. Many operations deem it more cost-effective to replace the membrane stocks instead of cleaning contaminant from the membrane.

The membrane life is important to the continuous operation and operational costs of the filtration system. Membranes manufactured by W. L. Gore and National Filter Media typically have a twelve to twenty-four month life with no catastrophic failures in industrial conditions at a temperature of 160° F. and a pH greater than 13. Anticipated operating conditions for the present invention are ambient temperature and a pH between 4 and 11. It is expected that membranes used according to the present invention will have a life equal to or greater than 18 months. The filtration system operates at a low pressure, preferably between 5 and 15 psi. Greater pressures are possible; however, the higher the pressure, the quicker the membrane loss of flux rate. The operating pressure is preferably no more than 24 psi. The following examples are offered to further illustrate the present invention. These examples are intended to be purely exemplary and should not be viewed as a limitation on any claimed embodiment.

EXAMPLE 1

In accordance with the present invention, actual animal processing waste water containing animal contaminants and FOG was processed. Sodium hypochlorite (at an ratio of 0.001:1) was used as the oxidant. Aluminum Chlorohydrate (Al=6 or more) was used as the inorganic polymeric compound. Polyacrylamide was used as the coagulant. The membrane was obtained from National Filter Media having a Teflon coating and nominal pore size in the range of 5 microns. The operating pressure was 5–8 psi. The results are reported below in Table 1.

TABLE 1

| GPD | 680 | 840 | 960 | 1,505 | 1,600 |
|---|---|---|---|---|---|
| Temp. (° F.) Influent | 62.6 | 64.2 | 59.5 | 59.0 | 71.6 |
| Temp (° F.) Effluent | 63.1 | 62.6 | 58.7 | 60.0 | 44.6 |
| PH Influent | 9.82 | 10.93 | 9.09 | 9.38 | 10.29 |
| PH Effluent | 7.38 | 7.34 | 7.44 | 7.34 | 7.91 |
| TSS (mg/l) Influent | | 10,873.32 | 1,879.98 | 1,673.32 | 1,926.66 |
| TSS (mg/l) Effluent | 33.33 | 78.98 | 6.87 | 23.33 | 33.33 |
| TVSS (mg/l) Influent | | 9,126.66 | 1,539.98 | 1,289.99 | 1,740.00 |
| TVSS (mg/l) Effluent | 30.00 | 74.16 | 3.33 | 20.00 | 30.00 |
| COD (mg/l) Influent | | 21,958.33 | 11,370.00 | 12,191.66 | 8,626.66 |
| COD (mg/l) Effluent | 263.33 | 185.92 | 355.17 | 195.50 | 333.00 |
| BOD (mg/l) Influent | | 10,979.17 | 5,685.00 | 6,095.83 | 4,313.33 |
| BOD (mg/l) Effluent | 118.17 | 92.96 | 177.59 | 97.75 | 166.50 |

Reference is made to FIG. 1 which illustrates one possible waist water pretreatment system and microfiltration apparatus for high flow impurity removal within the scope of the present invention. The illustrated waste water pretreatment system 10 includes a plurality of pretreatment reactor vessels 12 and 14 which enable the waste water feed steam 16 from vessel 18 to chemically react with one or more chemical oxidants, polymeric compounds and/or coagulants. The chemical oxidant which reacts with contaminants and FOG in to waste water feed stream 16 are introduced into the pretreatment reactor vessels via chemical oxidant feed stream 20. The temperature, pH, TSS, TVSS, COD and DOD are measured by a plurality of sensors 22, 24 and 26 prior to pretreatment. The pH within the pretreatment reactor vessels is preferably monitored with a pH sensor 28. Acid a base may be added to the pretreatment reactor vessels, if necessary to adjust the to adjust the pH. However, this has not been observed as necessary for operation of the invention. In pretreatment reactor vessel 12 the waste water and oxidant are combined by mixer 30 such that the oxidant reacts with the contaminants and FOG to break down proteins. The waste water feed stream 16 is then moved to pretreatment reactor vessel 14. Chemical inorganic polymeric compounds which react with the contaminants in FOG in the waste water feed stream 16 are introduced into the waste water feed stream 16 via chemical inorganic polymeric compound feed stream 32. The inorganic polymeric compound and waste water feed stream 16 are combined by mixer 30 such that the inorganic polymeric compound associates and binds to suspended contaminant in FOG solids to form a first particulate having approximately in the range of 15–50 microns. Pumps 34 move the treated waste water steam from pretreatment reactor vessel to a incline plate separate; commonly referred to in the industry as a lamella separator 36. Chemical coagulants which react with the first particulate in the waste water feed stream are introduced into the waste water feed stream via chemical coagulant feed stream 38.

The number of pretreatment reactor vessels and chemical feed streams can vary depending on the number of chemicals, oxidants, polymeric compounds and coagulants being used and the reaction chemistry used to form the waste particulates. The size of the reactor vessels can be varied to provide different reaction times.

The coagulants reacts with the first particulate to form a second particulate having a size greater than 50 microns.

The treated waste water is then passed through an incline plate separator 36 so that the second particulate are removed from the treated waste water passing through the incline plate separator 36. The second particulate may then be removed from the incline plate separator and dewatered to recapture the waste water so that waste water may be returned to the waste water feed stream for treatment and the second particulate may be incorporated as a rendered product into a composition for consumption by a different species. The dewatering process may be carried out by passing the second particulate from the incline plate separator 36 to a centrifuge 40. A screw conveyor 42 moves the rendered solids from the centrifuge for other applications. Waste water recaptured during the dewatering process is returned to the first pretreatment reactor vessel 12 by centrifuge return stream 44. The treated waste water which was passed through the incline plate separator 36 is passed into a holding tank 46.

The rendered product is especially high in total dry matter and may be effectively used in the preparation of animal feed for species of animals other than from which the rendered product was generated. Other sludge or rendered product generated at different locations in the present invention have the same characteristics and properties when processed as above. In this embodiment, the rendered product was generated from animal contaminants and FOG from a cattle processing facility in accordance with the present invention. The results of one such test are reported below in Table 2, other testing has shown that the results in Table 2 are representative and at the lower end of the properties listed, hence additional examples will not be cited herein.

TABLE 2

|  | As Received Basis | 100% Dry Matter Basis |
|---|---|---|
| Total Moisture % | 89.0 | 0.000 |
| Total Dry Matter % | 11.0 | 100 |
| Crude Protein | 5.38 | 48.9 |
| Crude Fat (Ether Extract) % | 0.796 | 7.24 |
| Crude Fiber % | 0.270 | 2.46 |
| Calcium % | 0.260 | 2.28 |
| Phosphorus % | 0.0786 | 0.715 |
| Salt (Sodium × 2.54) % | 0.356 | 3.23 |

As a result of the high solids content of the solid waste product, waste water treatment facilities do not have to expend funds for disposing of sludge from the treatment process. Rather, the solid waste product is purchased by interested third parties for inclusion in animal feed. Accordingly, the operating costs for a waste water treatment facility embodying the present invention is significantly reduced.

Pumps 48 passed the treated waste water from the holding tank 46 through sand filters 50 that add pressure approximately no more than 80 psi such that the second particulate are removed from the treated waste water passing through the sand filter 50. The sand filters 50 are periodically backflushed to recapture the second particulate for incorporation as a solid waste product into a composition for consumption by a different species. The backflushed water is returned to the holding tank 18 for processing and the waste water treatment stream 16. Treated waste water is passed from the sand filters 50 to a holding tank 52.

Pump 54 passed the treated waste water through a carbon column 56 at a pressure approximately in the range of 25–75 psi such that the second particulate is removed from the treated waste water passing through the carbon columns 56. Periodically, water is backflushed through the carbon columns 56 to recapture the second particulate for incorporate as a solid waste product into a composition for consumption by a different species. The backflush water is returned to the holding tank 18 for treatment as the waste water feed stream. The filtered water from the carbon columns 56 is passed to a holding tank 58. Pump 60 then direct the treated waste water stream to one or more filtration vessels 62 via filtration vessel feed stream 64. The size of the feed stream 64 will depend on the design of flow rate of the filtration vessel. For example, in a system having three (3) filtration vessels, each handling 1,200,00 GPD, a ten (10) inch feed line to the system is suitable. Each filtration vessel 62 is a standalone filtration device. The number and size of each filtration vessel can vary depending on the system capacity requirements. The filtrate is removed from each filtration vessel via a filtrate stream 66.

Each filtration vessel preferably provides a mounting platform for the five (5) to fifteen (15) filtered cassette modules. One currently preferred filtered cassette module contains forty-nine (49) individual sock filters configured with one micron filtration membranes. The rate of flow rate is 400,00 GPD. Each full cassette module has 170 square feet of membrane area and is rated at 77,000 GPD with a differential pressure of no more than 24 psi. A lifting mechanism is preferably included to allow removal and replacement of the membrane cassette modules.

The filtration membranes are periodically backflushed with filtrate to remove solids from the membrane surface.

During the backflush procedure the filtration vessel is taken off line and waste water is drained from the filtration vessel via a backflush exit stream 68 to a backflush tank 70. The backflush tank 70 provides temporary storage before the backflush waste water is conveyed to the holding tank 18 via backflush return stream 72. It is estimated that 400–650 gallons of water will be used during a typical backflush cycle for a 400,00 GPD filtration vessel. A vacuum breaker may be provided to allow equalization of pressure within the respective filtration vessel during the backflush procedure. A vent/relief stream may also be provided to allow venting or release of excess or over pressurized waste water.

The filtrate side of the filtration vessel 62 is open to the atmospheric pressure. The filtrate is collected in the top of the filtration vessel and allowed to drain in the filtrate stream 66. This volume of water provides the positive head which when coupled with the negative head of draining the pressure side of the vessel via backflush exit stream 68, produces enough positive pressure gradient to backflush the filtration membrane.

After sufficient sludge settles within the bottom of the filtration vessel 62, the sludge is removed via a sludge discharge stream 74. While the sludge is removed, the filtration membranes are preferably rinsed with water from a water rinse stream 76. The collected sludge is returned to the first pretreatment vessel 12 for further processing.

Periodically, the membranes will require cleaning to remove trace amounts of organics or solids. Cleaning preferably occurs as needed or as part of a regular maintenance program. The vessel drain opens to remove all contaminants via the sludge discharge stream 74. The cleaning solution is introduced into each filtration vessel through cleaning supply stream 78. Typical cleaning solutions include acids, bases and surfactants. In some cases, the filtration vessel can be returned to operation without draining and rinsing the filtration membranes. If membrane rinsing is necessary, the contents of the filtration vessel 62 are removed via cleaning discharge stream 80 for further processing.

Multiple filtration vessels are preferably used, in parallel, to provide for the required flow rate. However, filtration vessels can be operated in series to provide primary filtration and secondary filtration. Because filtration vessels are taken off-line during the backflushing, additional filtration vessels and capacity are preferably used to ensure that the required discharge flow is maintained. An additional filtration vessel may be supplied to provide for off-line maintenance while the remainder of the system meets the flow rate requirements. The waste water treatment system preferably includes access to the various process streams to allow for sampling and analysis. The valves, pumps and sensors customarily used in the art to safely control the described fluid flow to and from the filtration vessels are preferably provided. Such valves, pumps and sensors also allow for automation of the process.

From the foregoing, it will be appreciated that the present invention provides a process for removing contaminants from waste water utilizing a positive physical barrier to precipitated particles. The positive separation barrier permits discharge having lower concentration limits than conventional flotation systems. The apparatus for removing contaminants from waste water occupies less space than conventional flotation systems. The apparatus is easily expandable.

The chemical pretreatment achieves particle formation based on size, not weight. As a result, chemical pretreatment costs are lower than those typically required for other systems.

The present invention may be embodied in other specific forms without departing from its essential characteristics. The described embodiments are to be considered in all respects only as illustrative and not restrictive. The scope of the invention is, therefore, indicated by the appending claims, rather than the foregoing description.

What is claimed is:

1. A process for removing animal processing contaminants and fats, oils and greases ("FOG") from large volumes of wastewater comprising the steps of:
   (a) treating a wastewater stream containing animal processing contaminants and FOG with an oxidant, wherein the oxidant reacts with the contaminants and FOG to break down proteins;
   (b) treating the treated wastewater stream with an inorganic polymeric compound, wherein the inorganic polymeric compound dissociates and binds to suspended contaminant and FOG solids to form a first particulate having a size approximately in the range of 15–50 microns;
   (c) treating the treated wastewater stream with a coagulant, wherein the coagulant reacts with the first particulate to form a second particulate having a size greater than 50 microns;
   (d) passing the treated wastewater stream through an inclined plate separator such that the second particulate are removed from the treated wastewater stream passing through the inclined plate separator,
   (e) passing the treated wastewater stream through a sand filter at a pressure approximately no more than 80 psi such that the second particulate are removed from the treated wastewater stream passing through the sand filter;
   (f) passing the treated wastewater stream through a carbon column at a pressure approximately in the range of 25–75 psi such that the second particulate is remove from the treated wastewater stream passing through the carbon column;
   (g) passing the treated wastewater through a micro filtration membrane having a pore size approximately in the range from 0.5 micron to 10 microns, wherein the treated wastewater flow rate is at least 200 gallons per square foot of membrane per day ("GFD"), such that the animal processing contaminants and FOG are removed from the treated wastewater stream passing through the micro filtration membrane; and
   (h) periodically backflushing the micro filtration membrane to remove the second particulate from the membrane surface.

2. The process as recited in claim 1, wherein the oxidant is in the range from 5 parts per million ("PPM") to 100 PPM.

3. The process as recited in claim 1, wherein the oxidant is sodium hypochlorite, ozone, peroxides, potassium hypochlorite or chlorine dioxide.

4. The process as recited in claim 1, wherein the inorganic polymeric compound is an aluminum chlorohydrate, polyaluminum chloride, aluminum sulfate, ferric sulfate, calcium aluminate or sodium aluminate.

5. The process as recited in claim 1, wherein the coagulant is an anionic polyacrylamide.

6. The process as recited in claim 1, wherein the coagulant is a cationic polyamine.

7. The process as recited in claim 5, wherein the anionic polyacrylamide is at a dose of approximately at least 3 PPM.

8. The process as recited in claim 7, wherein the anionic polyacrylamide is at 40 to 50 mole percent and 80 to 100 percent anionic charge.

9. The process as recited in claim 1, wherein the microfiltration membrane comprises polypropylene felt with a coating of polytetrafluoroethylene (PTFE).

10. The process as recited in claim 1, wherein the microfiltration membrane comprises polypropylene or polyethylene membrane bonded to a polypropylene or polyethylene felt backing.

11. The process as recited in claim 1, wherein the treated wastewater is passed through the microfiltration membrane at a pressure approximately no more than 24 psi.

12. The process as recited in claim 1, further comprising the steps of removing the second particulate from the inclined plate separator, and dewatering the second particulate to recapture the wastewater so that the wastewater may be returned to the waste-water stream for treatment and the second particulate may be incorporated as a solid waste product into a composition for consumption by a different species.

13. The process as recited in claim 1, further comprising the step of periodically backflushing the sand filter to recapture the second particulate for incorporation as a solid waste product into a composition for consumption by a different species.

14. The process as recited in claim 1, further comprising the step of periodically backflushing the carbon column to recapture the second particulate for incorporation as a solid waste product into a composition for consumption by a different species.

15. The process as recited in claim 1, wherein the treated wastewater discharged from the microfiltration membrane has a biological oxygen demand ("BOD") less than 25 PPM.

16. The process as recited in claim 1, wherein the treated wastewater discharged from the microfiltration membrane has a chemical oxygen demand ("COD") less than 25 PPM.

17. The process as recited in claim 1, wherein the treated wastewater discharged from the microfiltration membrane has total suspended solids ("TSS") less than 1 PPM.

18. The process as recited in claim 1, wherein a potential of hydrogen ("pH") is in the range of approximately 4–11.

* * * * *